(No Model.)
A. J. BOTTORFF.
BICYCLE AND TRACK THEREFOR.
No. 450,926. Patented Apr. 21, 1891.
Fig.1.
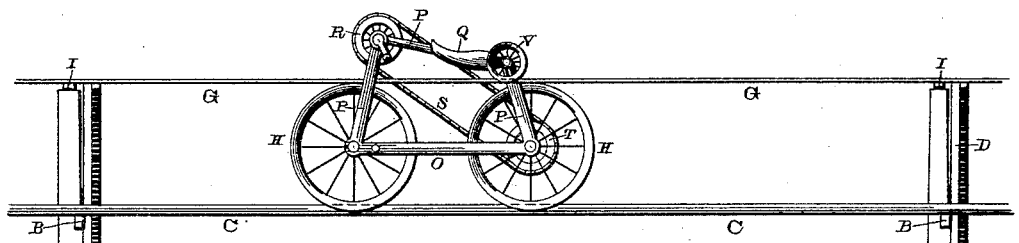
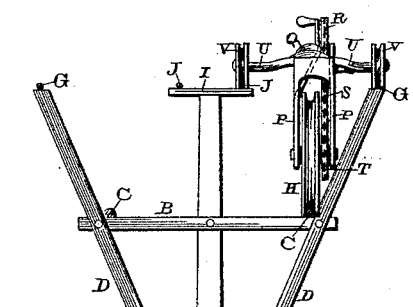
Fig.2.
Witnesses:
E. P. Ellis
J. M. Nesbit
Inventor
A. J. Bottorff
per
Lehmann & Pattison,
attys.

UNITED STATES PATENT OFFICE.

ANDREW J. BOTTORFF, OF BUENA VISTA, COLORADO.

BICYCLE AND TRACK THEREFOR.

SPECIFICATION forming part of Letters Patent No. 450,926, dated April 21, 1891.

Application filed December 9, 1890. Serial No. 374,037. (No model.)

*To all whom it may concern:*

Be it known that I, ANDREW J. BOTTORFF, of Buena Vista, in the county of Chaffee and State of Colorado, have invented certain new and useful Improvements in Bicycles; and I do hereby declare the following to be a full, clear, and exact description of the invention, such as will enable others skilled in the art to which it pertains to make and use it, reference being had to the accompanying drawings, which form part of this specification.

My invention relates to an improvement in bicycles and tracks therefor; and it consists in a bicycle which is to be operated either by cranks or levers, and which is provided with two extra balancing-wheels, in combination with an elevated track upon which the main wheels of the bicycle are to run, and wires placed upon opposite sides of the track and upon which the balancing-wheels run, as will be more fully described hereinafter.

The object of my invention is to provide an elevated track upon which bicycles carrying one or more persons are to be run, and by means of which persons can travel from one place to another with great rapidity and with perfect safety.

Figure 1 represents a side elevation of a bicycle and its track which embody my invention. Fig. 2 is an end view of the same.

A represents a series of posts of any desired height, and which are placed any suitable distance apart. Near the top of each post is secured a cross-bar B, upon which the track or tracks C are secured. This cross-bar is supported at its ends by the diagonal braces D, which extend upward beyond the cross-bar B sufficiently far to form supports for the two outside wires G. Secured to the top of the posts A are the short cross-pieces I, which support the inside wires J upon a level with the outer wires G. Two tracks C are here shown, so that bicycles can pass each other in going in opposite directions; but, if so desired, only a single track may be used, in which case only the two outer wires G will be needed.

The bicycle, which is to run upon the track C, is composed of the two large wheels H, which are connected by means of the side bars O, upon which the rider places his feet while upon the bicycle. Rising from the axles of the two wheels H is the frame P, which may be either of the shape here shown or any other that may be desired, and upon the top of which the seat Q is placed. At the front corners of the frame P is placed the operating-wheel R, which is provided either with cranks or levers, which are to be operated by the hands of the rider, and from which wheel R extends the driving-chain S to the small wheel T, placed upon the axle of the rear wheel H.

In order to prevent the bicycle from tilting over, it is provided at the rear upper corner of the frame with a cross-arm U, upon the ends of which the wheels V are journaled. These wheels run upon the wires placed upon the opposite sides of each track and serve to hold the bicycle always in an upright position. The wheels V H are preferably grooved, so that they will run upon the track and the wires without the slightest danger of running off. The riders will mount to the tracks and the bicycles by means of steps or ladders prepared for that purpose. The tracks being perfectly smooth and there being no danger of the bicycles upsetting, persons can go from one place to another upon the track with great rapidity and ease to themselves.

Having thus described my invention, I claim—

1. The combination of the track, the posts upon which the track is mounted, and wires placed upon opposite sides of the track with a bicycle provided with wheels both to run upon the track and upon the wires, substantially as shown.

2. The combination, with an elevated track and wires placed upon opposite sides thereof, of a bicycle provided with an operating-wheel and wheels which bear upon the wires to prevent the bicycle from upsetting, substantially as described.

3. The combination of the posts, the cross-pieces B, secured thereto, the diagonal braces or supports D, the cross-pieces I, and the wires G J with the bicycle provided with a cross-arm U, carrying the wheels V, substantially as set forth.

In testimony whereof I affix my signature in presence of two witnesses.

ANDREW J. BOTTORFF.

Witnesses:
CHAS. LOGAN,
H. E. CORSER.